United States Patent [19]

Frank

[11] Patent Number: 5,093,967
[45] Date of Patent: Mar. 10, 1992

[54] ATTACHMENT MECHANISM FOR NONWOVEN THERMOFORMED ARTICLES AND METHOD OF MANUFACTURE THEREOF

[75] Inventor: George A. Frank, Auburn, Me.

[73] Assignee: Gates Formed-Fibre Products, Inc., Auburn, Me.

[21] Appl. No.: 581,603

[22] Filed: Sep. 12, 1990

[51] Int. Cl.⁵ ............................................. A44B 17/00
[52] U.S. Cl. .................................................... 24/693
[58] Field of Search ................... 24/693, 90 HA, 686, 24/682; 16/4; 428/212, 99, 190

[56] References Cited

U.S. PATENT DOCUMENTS

| | | | |
|---|---|---|---|
| 2,032,499 | 3/1936 | Place | 16/4 X |
| 2,109,402 | 2/1938 | Place | 16/4 |
| 4,424,250 | 1/1984 | Adams et al. | 428/212 X |
| 4,818,586 | 4/1989 | Smith et al. | 428/212 X |
| 4,825,516 | 5/1989 | Ackermann et al. | 24/693 |

Primary Examiner—James R. Brittain
Attorney, Agent, or Firm—J. L. Isaac; C. H. Castleman, Jr.; H. W. Oberg

[57] ABSTRACT

A device for attaching thermoformed substrate material having front and back surfaces to a support frame. The device includes a fastener having a base portion and an attachment portion projecting from the base portion for engagement with the support frame. A nonwoven, needle-punched fiber sheet having first and second surfaces sandwiches the base portion between the first surface of the sheet and the back surface of the substrate. The sheet includes a central aperture having a width dimension sufficiently great to permit the attachment portion to project therethrough yet sufficiently narrow to enable the sheet to overlay the base portion. The sheet includes an enriched area of lower melting point fiber disposed proximate the first surface of the sheet and activatable to bond the first surface of the sheet to the back surface of the substrate without material flow and at a temperature utilized to thermoform the substrate material. This secures the base portion to the substrate material.

11 Claims, 2 Drawing Sheets

ATTACHMENT MECHANISM FOR NONWOVEN THERMOFORMED ARTICLES AND METHOD OF MANUFACTURE THEREOF

BACKGROUND OF THE INVENTION

1. Field of the Invention

This invention relates to thermoformed articles and methods of manufacture thereof and, more particularly, to fastener devices for securing such thermoformed articles to support structures. Specifically, the present invention relates to an improved fastening device which is integrally formed with the thermoformed components at the time of formation of the thermoformed article.

2. Description of the Prior Art

Many situations arise where it is desirable to cover irregular surfaces with carpeting material. A common example of this is to cover the trunk of a car with a carpeting material as well as trim areas such as door panels, dash components and the like. In order to work well, such a carpeting material must be capable of taking on irregular, uneven shapes. It must have good hand feel, it must look good, and it must be resistant to the effects of water and soil.

In response to this need, carpet-like material and components have been constructed out of nonwoven, synthetic fibers. These fibers are easy to shape in contour around irregular and uneven surfaces, and if the carpet-like material is attached to a suitable substrate with the appropriate thermal response characteristics, a piece of material can be molded under conditions of pressure and heat to take on the general outline of the area to be carpeted. This particular process is known as thermoforming and has become quite popular in the nonwoven carpet industry. In addition, ways of manufacturing such carpeting as well as cutting and molding the carpeting to a given shape have been developed. One common approach is to make a soft bulky assembly of fibers, known as a batt, and then attach the batt to carpeting that has been produced from a nonwoven or other available technology. The carpet is attached by a needle loom by pushing the needle downwards into the bulk of fibers. The needle has downwardly-facing barbs on it. In a reverse-fishook principle, the barbs that are being pushed in a downward direction tend to catch fibers and pull them downward so as to thoroughly entangle and intermix the fibers among each other. This results in a batt that has been compressed, and is less likely to fray. The process of running such fibers through the needle loom is commonly known as needle-punching, or simply needling. This particular process is discussed in more detail in U.S. Pat. No. 4,424,250, the disclosure and contents of which are specifically incorporated herein by reference, this particular patent being assigned to the assignee of the present invention.

Taking this process a step further, ways have been developed for making nonwoven fiber carpeting that has desirable carpet-like qualities, good hand-feel, an absence of fused, glossy or shiny surface areas which can be shaped around particularly sharp contours, and which have enough stiffness to cover vertical surfaces without having to be affixed onto such a surface. This particular concept evolved into a nonwoven, needle-punched carpeting which formed into a relatively rigid textile panel from a loosely consolidated, nonwoven fibrous batt. The batt may be composed of different types of fibers that have been chosen so that the needle-punching process tends to force one type of the fiber to the surface of the final product. In this manner, a particular substrate may be formed having a concentration of one type of fiber on one surface versus the opposite surface. This particular development is disclosed in U.S. Pat. No. 4,818,586, the contents of which are specifically incorporated herein by reference and which has been assigned to the assignee of the present invention.

Alternatively, a carpet may be attached to a nonwoven substrate which may differ in chemical composition from the carpet face via the needle-punching process. Upon exposure to conditions of suitable heat and pressure, the composite will form a relatively rigid panel or shape.

Once a substrate component of sufficient rigidity and contour has been formed, there remains the problem of attaching the component to a support frame or assembly, such as a trunkliner or door panel structure. Attaching mechanical fasteners to automotive trim parts is therefore a necessary fact in the production of these materials. In the past, one form of attaching such fasteners has been simply to glue or in some other way physically attached a fastener to the back surface of the substrate component in a separate procedure, such as by using hot melt adhesives and the like.

In another system, certain substrates are formed by undergoing extremely high pressure and temperature during the molding cycle and are able to use fasteners that are embedded in the substrate during the material flow achieved in the forming stage. An advantage to this technique is that the placement of the fastener is consistent from part to part as well as avoiding a separate, off-line assembly operation. However, in the past this procedure has only been available for high pressure, high temperature processes which cause material flow during substrate formation so as to embed the fastener within the actual substrate itself. This process has not been usable with low pressure, thermoformed parts where molding of the substrate is accomplished only with latent heat of the substrate, since the molds themselves are nonheated. The above process cannot be used in such low pressure thermoformed operations due to the lack of substantial material flow during the forming operation. Thus, there remains a need to provide a fastening system wherein fasteners may be integrally formed with the thermoformed components during on-line assembly formation of the component article.

SUMMARY OF THE INVENTION

Accordingly, it is an object of the present invention to provide a fastening device for thermoformed components.

It is yet another object of the invention to provide a method or system for attaching fasteners to thermoformed components during the process of formation of the thermoformed component.

To achieve the foregoing and other objects and in accordance with the purpose of the present invention, as embodied and broadly described herein, a device for attaching thermoformed substrate material having front and back surfaces to a support frame is disclosed. A fastener includes a base portion and an attachment portion projecting from the base portion for engagement with the support frame. A nonwoven, needle-punched fiber sheet having first and second surfaces sandwiches the base portion between the first surface of the sheet and the back surface of the substrate material. The sheet defines a central aperture having a width dimension sufficiently great to permit the fastener attachment portion to project therethrough yet sufficiently narrow to enable the sheet to overlay the fastener base portion. The sheet includes an enriched area of lower melting point fiber disposed proximate the first surface thereof and activatable to bond the first surface of the sheet to the back surface of the substrate material without material flow and at a temperature utilized to thermoform the substrate material, thereby securing the fastener base portion to the substrate material.

In addition, a method of integrally attaching a fastener device having a base and connecting portion to the back surface of a thermoformed textile component during the process of thermoforming thereof is disclosed. The method includes forming a patch of nonwoven, preferentially needled and thermobonded fibers having an enriched first surface of lower melting point bonding fibers. A central aperture is created in the patch. The base of the fastener is positioned against the back surface of the textile component and the patch is placed against the back surface of the component with the fastener connecting portion extending through the aperture in the patch, the enriched first surface of the patch being placed adjacent to the back surface of the textile component. This may be done as a separate step or in conjunction with mold closure during the thermoforming process. The textile substrate is then thermoformed to form the thermoformed component such that the latent heat from the component softens and melts the enriched surface of the patch to bond the patch to the component and trap the fastener between the patch and the back surface of the component to integrally mold the same therein.

DETAILED DESCRIPTION OF THE PREFERRED EMBODIMENTS

One important aspect of the present invention is that it avoids using substrate material flow during molding in order to secure the fastener system to the back of the molded parts as in certain prior devices. The present invention retains the advantage of in-mold application, resulting in the correct placement of fasteners in a low pressure, thermoforming system. Moreover, off-line assembly using hot melted adhesives, glue, and the like are also avoided, which systems tend to fail over time and result in improper placement of fasteners.

The present invention utilizes the latent heat available from the heated substrates during the thermoforming process to activate the fastener retention material comprised of a mixture of lower melting point fibers and reinforcing fibers. The retention patch used in the present invention has been preferably preferentially needled and thermally bonded to achieve an enriched surface of the lower melting point fibers using techniques disclosed in detail in U.S. Pat. No. 4,818,586, the contents of which have already been previously incorporated and will not be specifically discussed expect as needed herein. However, it is to be understood that the techniques and disclosure of the referenced patent are to be included for use as part of the present disclosure. Moreover, it should also be noted that while the detailed description and specific embodiments of the invention as discussed herein are directed toward attaching fastener devices to nonwoven, textile-type substrates, the present invention is not to be so limited and may in fact be utilized with any type of thermoformed substrate component such as extruded polypropylene substrate, plastic coated cloth or carpet, or the like.

Figure 1:
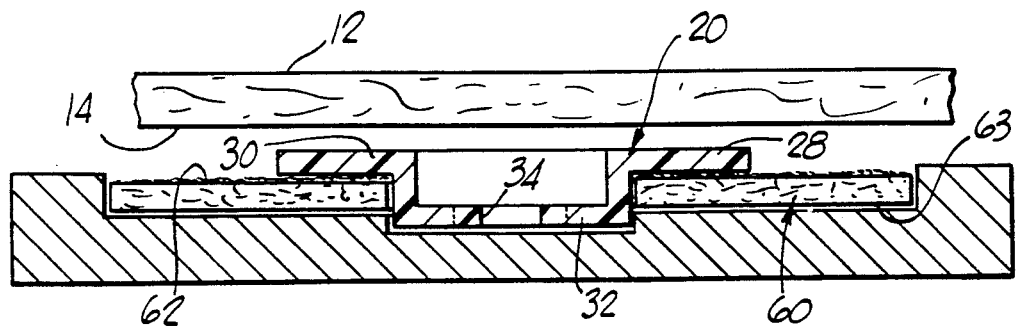
FIG. 1 is a side schematic, with some parts in section, illustrating placement of the fastener and patch in the mold during process of the invention.
Figure 2:
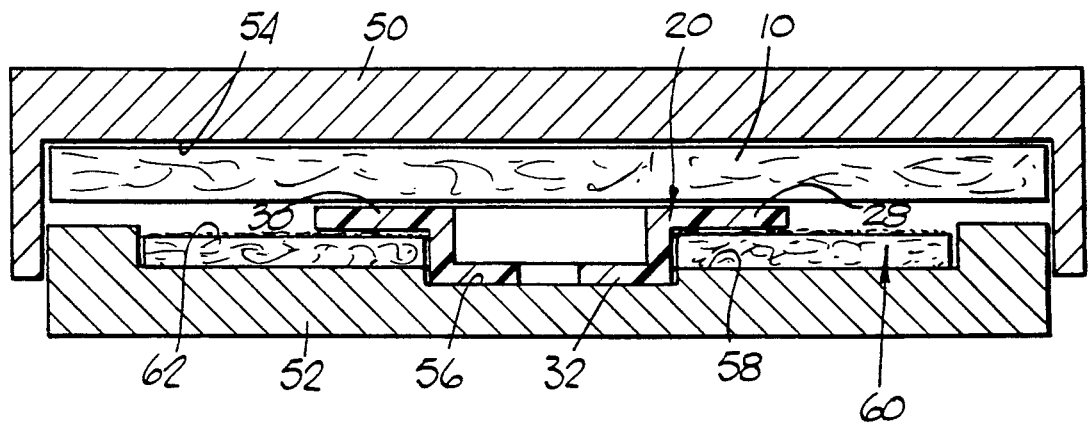
FIG. 2 is a schematic similar to FIG. 1 which shows placement of the textile substrate in position over the patch as well the second half of the mold.
Figure 3:
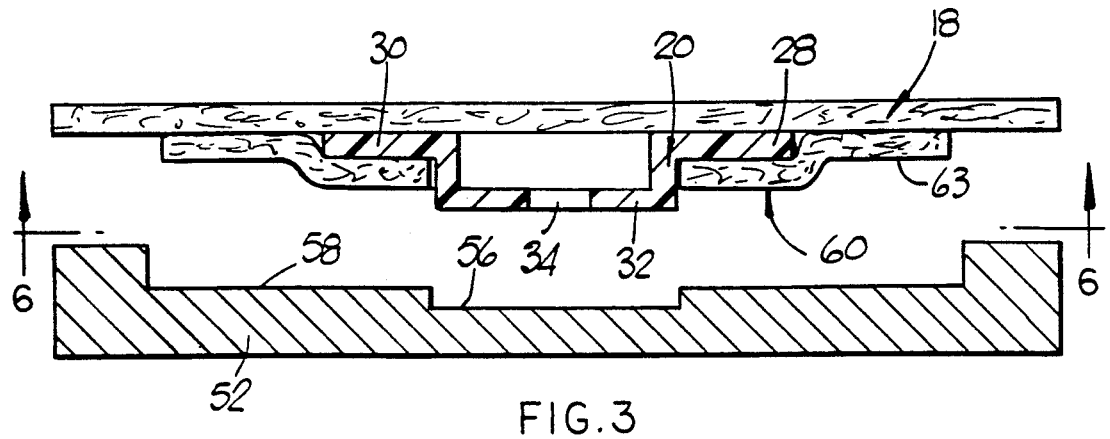
FIG. 3 is a schematic similar to that of FIGS. 1 and 2 illustrating completed thermoformed component with integrally bonded fastener removed from the mold.
Figure 4:
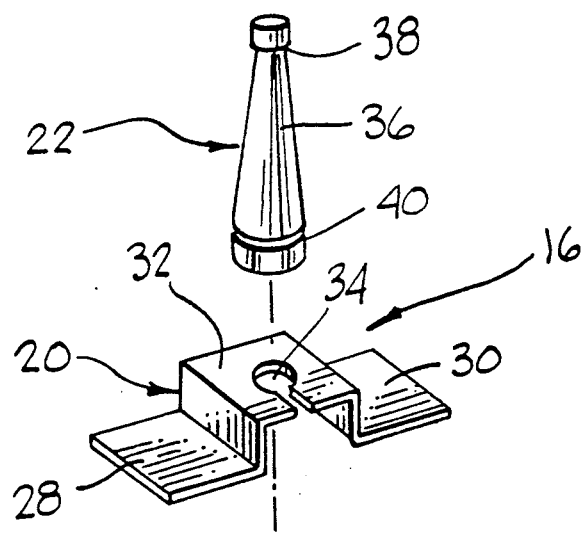
FIG. 4 is a front perspective view of one embodiment of the fastening device useful in the present invention.
Figure 5:
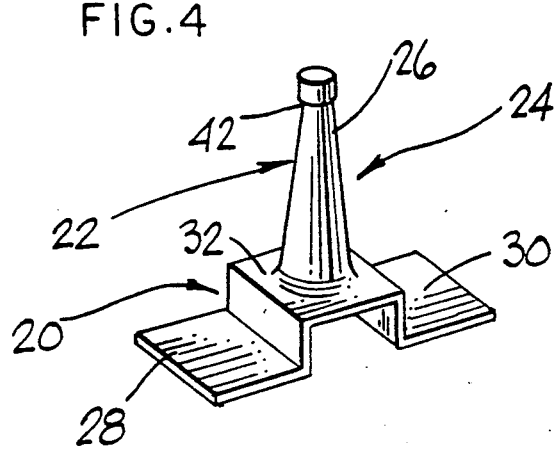
FIG. 5 is front perspective view of yet another fastener useful with the present invention.

Referring now to FIGS. 1–6, a nonwoven, needle-punched fiber substrate 10 is formed preferably utilizing the process disclosed in U.S. Pat. No. 4,818,586. It should be understood, however, that any type of thermoforming textile substrate may be utilized with the present invention. The substrate 10 includes a front surface 12 and a back surface 14. A fastener device 16 is integrally incorporated into the final thermoformed component 18 and includes in general a base member or portion 20 and an attachment or connecting portion 22. Referring particularly to FIGS. 4 and 5, the embodiment of FIG. 4 illustrates one preferred fastener device 16 that includes a removable attachment member 22, while the embodiment in FIG. 5 illustrates yet another preferred fastener device 24 having an integrally molded and unitary connecting portion 26.

In the first embodiment of the fastener 16 of FIG. 4, the base member 20 includes a pair of wing members or flanges 28, 30 projecting outwardly from a raised head portion 32 which is in the form of a platform or land surface. The platform 32 includes a keyway 34 cut therein for receiving the selectively detachable connecting member 22. The connecting member 22 preferably includes a connecting portion 36 which is designed to snap-fit into an aperture in any structural support member (not illustrated) and is maintained therein by grooves 38. An annular groove or channel 40 is disposed around the base portion of the connecting member 22 and is sized and shaped for firm connection within the key 34. In this manner, the fastener 16 may be molded into the substrate 10 by simply molding the base member 20 and then attaching the connecting portion 22 after the textile component has been thoroughly formed.

In the alternate fastener embodiment illustrated in FIG. 5, the base member 20 includes the wings of flanges 28, 30 as in the prior embodiment. However, the head portion 32 includes the integral connecting member 26 having a notch 42 therein for connecting to a structural support member. In this instance, the fastener 24 including the connecting portion 26 is entirely formed with the substrate 10, with appropriate modifications to the mold being made as described below.

Referring more particularly now to FIGS. 1–3 and 6, the textile substrate 10 is thermoformed by first heating it as in the process disclosed in U.S. Pat. No. 4,818,586 and then placing it between two mold halves 50 and 52. The mold halves 50 and 52 are sized and shaped to provide the desired contouring of the final thermoformed component 18. More particularly, the substrate 10 is placed within the recess 54 of the mold half 50, and a recess 56 is provided in the mold half 52 for placing the base portion 20 of the fastener 16. A second recessed portion 58 is provided circumferentially around the recessed portion 56 at a slightly less depth than the recess 56 and is sized and shaped for receiving the retention patch 60. In this manner, the fastener 20 and the patch 60 may be placed within the mold half 52 for bonding to the substrate 10 during the process of thermoforming of the substrate 10 into the component part 18.

The patch 60 is used to sandwich the extended base 20 of the fastener 16 between the patch 60 and the substrate material 10 as illustrated clearly in FIGS. 1-3 and 6. The patch 60 is preferably made up of a nonwoven needle-punched fiber sheet having first and second surfaces 62, 63. The sheet is made in accordance with the process disclosed in U.S. Pat. No. 4,818,586 and is formed from a first bonding fiber having a lower melting point or softening point and a second fiber having a melting or softening point higher than the first fiber. The temperature differentials between the melting or softening points of the first and second fibers are such that the first bonding fiber will melt at the temperatures generally used to thermoform the substrate 10 into the component 18. The melting point of the second reinforcing fiber is such that it will remain intact and unaffected by the temperatures used to thermoform the substrate 10.

The patch 60 is formed by forming a sheet of the nonwoven, needle-punched fiber material and then preferentially needling the material so as to form a first surface 62 enriched in the lower melting point, bonding fiber. The sheet of the material is then preferably heated by running it through an air thermal bonding oven of standard design at a sufficiently high temperature, such as about 250°-300° F., in order to melt or soften the lower melting point, bonding fibers while leaving the reinforcing fibers unaffected. This first heating and bonding operation insures a low elongation material which is necessary to prevent patch "stretch" from releasing the extended fastener base 20 when a load is applied to the fastener 16 during use of the component part 18.

The fiber sheet is then cut to a predetermined size to form the patch 60, and an aperture is then cut in the center of the patch 60 through which the head portion 32 of the fastener 16 will protrude. The patch is also cut to a sufficient size so that an effective amount of the patch 60 extends beyond the ends of the wings 28, 30 of the base 20, preferably a minimum of ⅜inches past all sides of the fastener 16. This sizing of the patch 60 is preferred in order to allow adequate bonding area about the base 20. The patch 60 is then placed over the fastener base 20 so that the head portion 32 protrudes therethrough, and this combination is then placed against the back surface 14 of the substrate 10. The substrate 10 is then thermoformed, and the patch 60 conforms and molds about the fastener base 20 so as to bond both to the fastener 20 as well as to the back surface 14 of the thermally bonded component 10.

In order to achieve this construction, the patch 60 and the fastener base 20 are loaded into the specially designed recesses 56, 58 in the molding half 52 with the lower melting fiber enriched side 62 of the patch 60 facing the substrate 10. The sizing of the recesses 56, 58 is very important in that insufficient clearance will result in visual disturbances of the face side 12 of the thermally formed component 18 in the form of bumps, resin strike-through from the substrate, and the like. Too large a clearance will not promote good bond formation. Ideally, the fastener 16 has some feature which aids in location and retention in the mold recess. In the embodiment illustrated in FIG. 5, this mold location feature could be combined with the integrally molded connecting member 26 which would have to be positioned within an aperture (not illustrated) or the like in the recess 56.

During the molding operation itself, contact between the heated substrate 10 and the patch 60 is made at mold closure. The substrate is first heated and then placed between the molds 50, 52 (see U.S. Pat. No. 4,818,586). The latent heat from the substrate 10 softens and melts the enriched surface 62 of the patch 60 and forms the bond, thus trapping the fastener base 20 between the patch 60 and the substrate 10. Mold cooling is performed as usual, after which the resulting component 18 is removed from the mold cavity with the fastener 16 integrally formed in place. In the embodiment illustrated in FIGS. 1-3 and 6, only the fastener base 20 is integrally molded into the component 18. In this embodiment, the next step is required wherein the connecting member 22 is snap-fit into the head portion 32 of the base 20 so that the groove 40 is matched with the key 34 thereby forming the completed fastener 16.

Figure 6:
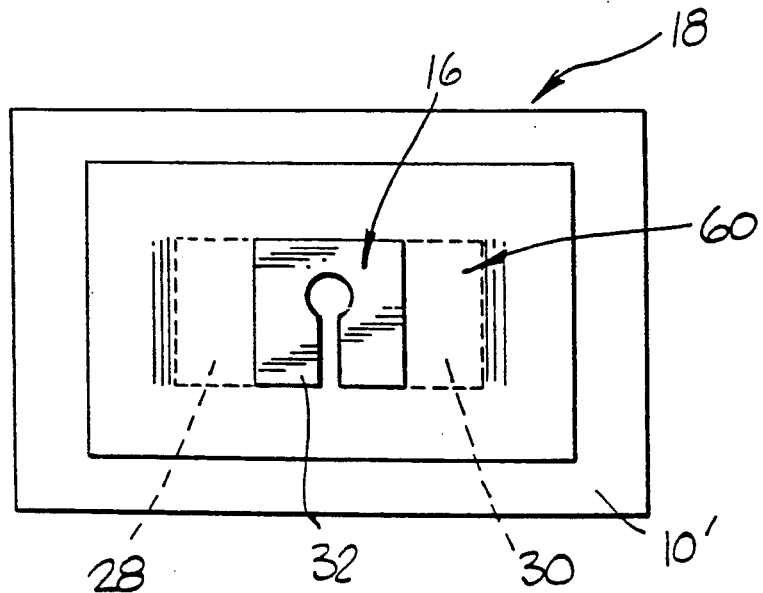
FIG. 6 is a top plan view of the thermoformed component with integrally molded fastener of FIG. 3 taken substantially along line 6—6 of FIG. 3.

It should be understood that a wide variety of different fibrous materials may be utilized in the present invention, and that more than just two fibers may be utilized in the patch 60 and/or the substrate 10. It is also envisioned that a single fiber of bicomponent nature, for example, a core of higher melting polymer surrounded by a sheath of a lower melting component, may be utilized in the construction of the patch 60 and/or the substrate 10. For purposes of illustration and discussion, only two fiber types are specifically disclosed and discussed although additional numbers of fibers are envisioned within the scope of the present invention as well as the bicomponent fiber discussed above. In the preferred embodiment, polyethylene fiber is utilized as the low melting point fiber in the patch 60 while polypropylene fiber is utilized as a reinforcing fiber in the patch 60. In a specific example of a preferred embodiment, one preferred construction for the patch 60 includes utilizing a dry laid needle-punch nonwoven material of approximately -oz./yd² comprised of 60-80 percent 30 denier polyethylene fibers and 20-40 percent of 16-18 denier polypropylene fibers. These fibers are carded, cross-lapped and needle-punched with approximately 800 ppsi (penetrations per square inch) using a medium efficiency 32 gauge felting needle at a depth of about 13 mm penetration. This material was run through an air thermal bonding oven at a temperature of approximately 270° F. in order to melt the polyethylene fibers while leaving the polypropylene reinforcing fibers unaffected. This particular patch was then attached to a substrate as described above. The resulting fastener 16 was integrally bonded to the component 18 as illustrated in FIG. 6 in very firm fashion without any patch stretch when a load was applied.

The fastener 16 or 24 may be constructed from any appropriate material is preferably made from a plastic material capable of withstanding the temperatures of thermoforming without any changes in structure or form.

As a result of the above, it can be seen that an improved fastening system or device for thermoformed textile components is provided wherein the fastener is integrally molded into the thermoformed component part itself. The fastener is capable of withstanding substantial loads without stretch or without failure. Using the process of the present invention, fasteners can be positioned in the same place time after time, part after part, to insure uniformity in the formation of automobile components or other similar assembly line components utilizing thermoformed textile materials. The present invention is particularly efficient in that it provides a strong fastening system without additional off-line or off-assembly steps as previously required with thermoformed components. Consequently, an improved product is provided at a reduced cost with greater uniformity of manufacture.

The foregoing description and the illustrative embodiments of the present invention have been shown in the drawings and described in detail in varying modifications and alternate embodiments. It should be understood, however, that the foregoing description of the invention is exemplary only, and that the scope of the invention is limited only to the claims as interpreted in view of the prior art.

What is claimed is:

1. A device for attaching thermoformed substrate material having front and back surfaces to a support frame comprising:
    fastener means including a base portion and an attachment portion projecting from said base portion for engagement with said support frame;
    a nonwoven, needle-punched fiber sheet having first and second surfaces and sandwiching said base portion between the first surface of said sheet and the back surface of said substrate material, said sheet defining a central aperture having a width dimension sufficiently great to permit said attachment portion to project therethrough yet sufficiently narrow to enable said sheet to overlay said base portion; and
    said sheet comprising an enriched area of lower melting point fiber disposed proximate said first surface and activatable to bond the first surface of said sheet to the back surface of said substrate material without material flow and at a temperature utilized to thermoform said substrate material to secure said base portion to said substrate material.

2. The device as claimed in claim 1, wherein said base portion is aligned against the back surface of said substrate material.

3. The device as claimed in claim 2, wherein said base portion includes a pair of wing members aligned opposite each other sized and shaped to be sandwiched between said sheet and said substrate material.

4. The device as claimed in claim 3, wherein said base portion further includes a central head member in the form of a raised platform to which said wing members are attached, said platform extending through said aperture and projecting above the level of the second surface of said sheet, said attachment portion projecting outwardly from said raised platform.

5. The device as claimed in claim 4, wherein said attachment portion is selectively detachable from said platform.

6. The device as claimed in claim 1, wherein said sheet comprises a mixture of said lower melting point bonding fibers and reinforcing fibers having a melting point higher than said bonding fibers, said lower melting point bonding fibers being softened and rehardened so as to fuse to one another and to the reinforcing fibers as well as to the substrate material to bond said sheet to said substrate material.

7. The device as claimed in claim 6, wherein the said sheet is preferentially needled so as to create said enriched area of lower melting point bonding fibers along the first surface of said sheet.

8. A device for fastening thermoformed textile fiber panels to support structures adapted to receive said panels, comprising:
    a fastener including a base secured to the back surface of said fiber panel and a connecting member extending from said base, said connecting member being sized and shaped for press fit connection to said support structure;
    a nonwoven, needle-punched fiber patch having a second side formed predominantly of thermoplastic reinforcing fibers which, during needle-punching, have been preferentially snagged from a batt of said reinforcing fibers in a mixture with other thermoplastic bonding fibers having a lower temperature softening point than said reinforcing fibers, by needle barbs of a needle loom and then selectively driven to the second surface of said patch, and a first surface formed predominantly of such other lower temperature softening point bonding fibers, at least a portion of which have been softened and rehardened so as to fuse to one another and to said reinforcing fibers to at least partially anchor the reinforcing fibers, said patch sandwiching said fastener base between the first surface of said patch and the back surface of said fiber panel, said patch defining an aperture therein having a width dimension sufficiently great to permit said fastener connecting member to project therethrough yet sufficiently narrow to enable said patch to overlay said base; and
    the lower softening point temperature bonding fibers being activatable to bond the first surface of said patch to the back surface of said fiber panel without material flow and at a temperature utilized to thermoform said textile fiber panel to secure said fastener base to said panel during the thermoforming thereof.

9. The device as claimed in claim 8, wherein said base includes a pair of wing flanges projecting oppositely therefrom to provide an attachment platform for said fastener, said wing flanges being sandwiched between said patch and said fiber panel.

10. The device as claimed in claim 9, wherein said base further includes a head member to which said wing flanges are attached, said head member being in the form of a raised platform extending through said aperture to a level above the second surface of said patch, said connecting member projecting outwardly from the said platform.

11. The device as claimed in claim 10, wherein said connecting member is selectively detachable from said raised platform.

* * * * *